United States Patent [19]

Ghiglia et al.

[11] Patent Number: 5,424,743
[45] Date of Patent: Jun. 13, 1995

[54] 2-D WEIGHTED LEAST-SQUARES PHASE UNWRAPPING

[75] Inventors: Dennis C. Ghiglia, Placitas; Louis A. Romero, Albuquerque, both of N. Mex.

[73] Assignee: U.S. Department of Energy, Washington, D.C.

[21] Appl. No.: 251,988

[22] Filed: Jun. 1, 1994

[51] Int. Cl.$^6$ .................................................. G01S 13/90
[52] U.S. Cl. ...................... 342/25; 342/159; 342/162; 342/191; 342/195
[58] Field of Search ................ 342/25, 159, 162, 191, 342/194, 195

[56] References Cited

U.S. PATENT DOCUMENTS

| | | | |
|---|---|---|---|
| H1181 | 5/1993 | Rihaczek | 342/25 |
| 4,546,354 | 10/1985 | Boles | 342/179 |
| 4,546,355 | 10/1985 | Boles | 342/179 |
| 4,563,686 | 1/1986 | Boles | 342/25 |
| 4,594,662 | 6/1986 | Devaney | 364/400 |
| 4,723,124 | 2/1988 | Boles | 342/25 |
| 4,768,881 | 9/1988 | Juptner | 356/347 |
| 4,771,287 | 9/1988 | Mims | 342/25 |
| 4,924,229 | 5/1990 | Eichel et al. | 342/25 |
| 4,975,704 | 12/1990 | Gabriel et al. | 342/25 |
| 5,021,789 | 6/1991 | Shaw | 342/25 |
| 5,179,383 | 1/1993 | Raney et al. | 342/25 |
| 5,248,976 | 9/1993 | Niho et al. | 342/25 |
| 5,260,708 | 11/1993 | Auterman | 342/25 |
| 5,260,709 | 11/1993 | Nowakowski | 342/62 |

OTHER PUBLICATIONS

Ghiglia, D. C. et al, "Robust two-dimensional weighted and unweighted phase unwrapping that uses fast transforms and iterative methods," *J. Opt. Soc. Am.*, vol. 11, No. 1, pp. 107–117, Jan. 1994.
Ghiglia, D. C. et al, "Direct phase estimation from phase differences using fast elliptic partial differential equation solvers," *Optics Letters*, vol. 14, No. 20, pp. 1107–1109, Oct. 1989.
Hunt, B. R., "Matrix formulation of the reconstruction of phase values from phase differences," *J. Opt. Soc. Am.*, vol. 69, No. 3, pp. 393–399, Mar. 1979.
Lim, J. S., "Two-Dimensional Signal and Image Processing", Prentice-Hall, Englewood Cliff, N.J., pp. 148–162, 1990.
Press, W. H. et al, "Numerical Recipes: The Art of Scientific Computing," *Cambridge University Press*, pp. 401–407, 1986.
Ghiglia, D. C. et al, "High-Resolution Synthetic Aperture Radar Interferometry: Technology for Precise Terrain Elevation Mapping," Unpublished, pp. 1–12, 1994.

*Primary Examiner*—John B. Sotomayor
*Attorney, Agent, or Firm*—George H. Libman

[57] ABSTRACT

Weighted values of interferometric signals are unwrapped by determining the least squares solution of phase unwrapping for unweighted values of the interferometric signals; and then determining the least squares solution of phase unwrapping for weighted values of the interferometric signals by preconditioned conjugate gradient methods using the unweighted solutions as preconditioning values. An output is provided that is representative of the least squares solution of phase unwrapping for weighted values of the interferometric signals.

8 Claims, 4 Drawing Sheets

2-D WEIGHTED LEAST-SQUARES PHASE UNWRAPPING

The United States Government has rights in this invention pursuant to Contract No. DE-AC04-76DP00789 between the Department of Energy and American Telephone and Telegraph Company.

BACKGROUND OF THE INVENTION

Synthetic aperture radar (SAR) is a valuable imaging technique with wide-ranging applications in reconnaissance and remote sensing. It allows high resolution imaging at great distances in all weather conditions, day or night, by transmitting coherent broadband microwave radio signals from an aircraft or spacecraft platform, receiving the signals reflected from the terrain of interest, storing and processing the returns to synthesize a large aperture (allowing high resolution), and then focusing the data to form an image of the terrain's response to these radio signals. Because a SAR provides it's own illumination (microwaves) that penetrates virtually all weather disturbances, imagery can be obtained in almost all conditions.

In particular, SAR interferometry allows measurement of terrain height by examining and comparing the phase of two SAR images. These height measurements can be more accurate than the resolution of the SAR itself. SAR-derived digital elevation maps have been found to be accurate within 15 cm rms of very accurate laser theodolite and differential GPS ground surveys of the same terrain.

The fundamental key to the success of SAR imaging is that the signals transmitted and received are coherent; i.e., the transmitted signals are generated from a stable local oscillator in the radar and can be referenced in time and space to a common point. The received signals return after a precisely measurable time delay (depending in the distance to the terrain being illuminated) and they have a precisely measurable phase (or starting point on the radio wave) relative to the local oscillator reference. Coherence provides the means for synthesizing the effect of a large aperture (or antenna) which then permits much higher resolution imaging than could be provided with the physically small antenna carried on board the aircraft or spacecraft.

An important by-product of this coherent imaging (if the data are processed correctly) is that phase information is preserved in the SAR imagery that is available and can be exploited. Optical imagery, on the other hand, cannot be exploited in the same way as SAR imagery because the sun is an incoherent source of illumination and phase is not preserved.

The primary difference between optical and SAR imagery is that optical imagery shows the terrain reflectivity response to visible light whereas radar imagery shows the terrain response to radio waves.

Microwave imaging techniques, in particular SAR, can exploit the phenomena of interference to provide previously unavailable information with wide-ranging applicability. For example, SAR image collections can be processed in interferometric pairs to yield digital terrain-elevation maps accurate in relative elevation to a few centimeters. The spatial resolution of the terrain map is governed by the spatial resolution of the SAR images, typically a few feet to tens of feet. Elevation resolution is governed by the antenna separation (baseline), radar wavelength, and imaging geometry.

No other previously developed terrain elevation mapping technology (such as optical stereoscopy) can yield maps with such precision, especially considering the day/night, all weather capability and long standoff distances possible with SAR's. In addition, multiple-pass SAR image collections, with precise imaging repeat geometry but significant time lapse between collections, can be processed to detect extremely subtle sub-wavelength surface disturbances, ground motion, or other environmental changes.

Once such system is disclosed in U.S. Pat. No. 4,975,704, Dec. 4, 1990 of Gabriel et al. The process for making a SAR interferogram is set forth in Columns 2 and 3 of the patent and is incorporated herein by reference.

Phase unwrapping problems arise in scientific applications when a physical quantity (i.e., surface deformation, time delay, terrain elevation, etc.) is transduced or related to the phase of a complex signal (i.e., phase is the argument of a complex number; for example, the arctangent of the ratio of the imaginary to real parts). These signals are obtained, for example, during optical interferometry experiments, microwave interferometry (i.e., radio telescope aperture synthesis, SAR, coherent sonar beam-forming, and other applications). Because the phase is usually related in a nonlinear way to the signals being measured (i.e., arctangent computations, etc.), only the principal value of the phase can be readily obtained; that is, the computed phase lies between $\pm\pi$ radians. Such principal values are denoted as wrapped values. Additionally, since the phase is usually related to some physical quantity not having abrupt jumps in continuity, the wrapped phase values do not represent a useful measurement. It is necessary to remove phase discontinuities from the principal values in some logical way in order to obtain a more useful quantity; this process is known as phase unwrapping.

It is always possible to consistently unwrap samples of wrapped phases if they are considered a one-dimensional signal; i.e., a signal whose values depend on only one independent variable such as time (t) or position (x). One simply begins at the first wrapped phase sample and adds or subtracts a multiple of $2\pi$ radians to the next sample so that the absolute value of the phase difference between the second and first sample is less than $\pi$ radians. This procedure is generally referred to as a linear path following scheme and it continues for successive samples until the entire one-dimensional array is unwrapped. No matter how it is applied to a one-dimensional signal, it will yield the same result (within an arbitrary constant offset that is usually of no consequence). In other words, the phase difference between points A and B in the now unwrapped signal will be the same, no matter how it is unwrapped.

For two or more dimensional signals, the problem is much more complicated. In the one-dimensional case just mentioned, there was only one possible unwrapping path; namely, the linear path that traverses the linear array. In the two-dimensional case, there are very many possible unwrapping paths between arbitrarily selected points A and B. If the wrapped phase values are noisy (as will be the case for any real measurement), the unwrapped values can depend on the unwrapping path taken. In other words, the phase difference between the unwrapped values at points A and B will depend on the path taken between those points. In general, it will not be possible to obtain a consistent solution with a path following scheme for multidimensional phase unwrapping. Prior art that utilizes path following techniques, such as the Gabriel et al. patent, is full of heuristic and ad hoc patches attempting to solve or mitigate the resulting inconsistencies. No robust mathematical formalism has been applied to path following methods nor are those methods likely to yield acceptable solutions to the variety of problems encountered in practice.

Two-dimensional phase unwrapping methods that did not rely on path following had their roots in adaptive optics. It was later found that the two dimensional phase unwrapping problem could be stated in a formal least-squares sense, resulting in a Poisson equation with Neumann boundary conditions and amenable to solution on rectangular grids by a host of robust numerical methods (D. Ghiglia et al., "Direct phase estimation from phase differences using fast elliptic partial differential equation solvers,": Opt. Lett. 14, 1107–09, 1989). However, all these Poisson methods solved the normal (unweighted) least-squares problem; that is, all wrapped phase values were treated with equal weight. Obviously, some wrapped phase values would be more reliable than others (due to noise, etc.) depending on the physical experiment that led to the measurements in the first place. If it were possible to assign a weight to the measured values and efficiently solve the weighted least-squares phase unwrapping problem, this would provide a significant advance to the art and completely obviate the need for any path following method.

SUMMARY OF THE INVENTION

It is an object of this invention to provide weighted least-squares phase unwrapping without path following logic.

It is another object of this invention to provide weighted phase unwrapping using fast cosine transforms to derive unweighted phase values, and iterative techniques to solve the weighted least-squares unwrapping problem.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise a method and apparatus for phase unwrapping weighted values of interferometric signals whereby the least squares solution of phase unwrapping for unweighted values of the interferometric signals is determined, and these values are used as preconditioning values to determine the least squares solution of phase unwrapping for weighted values of the interferometric signals by preconditioned conjugate gradient methods.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

Figure 1:
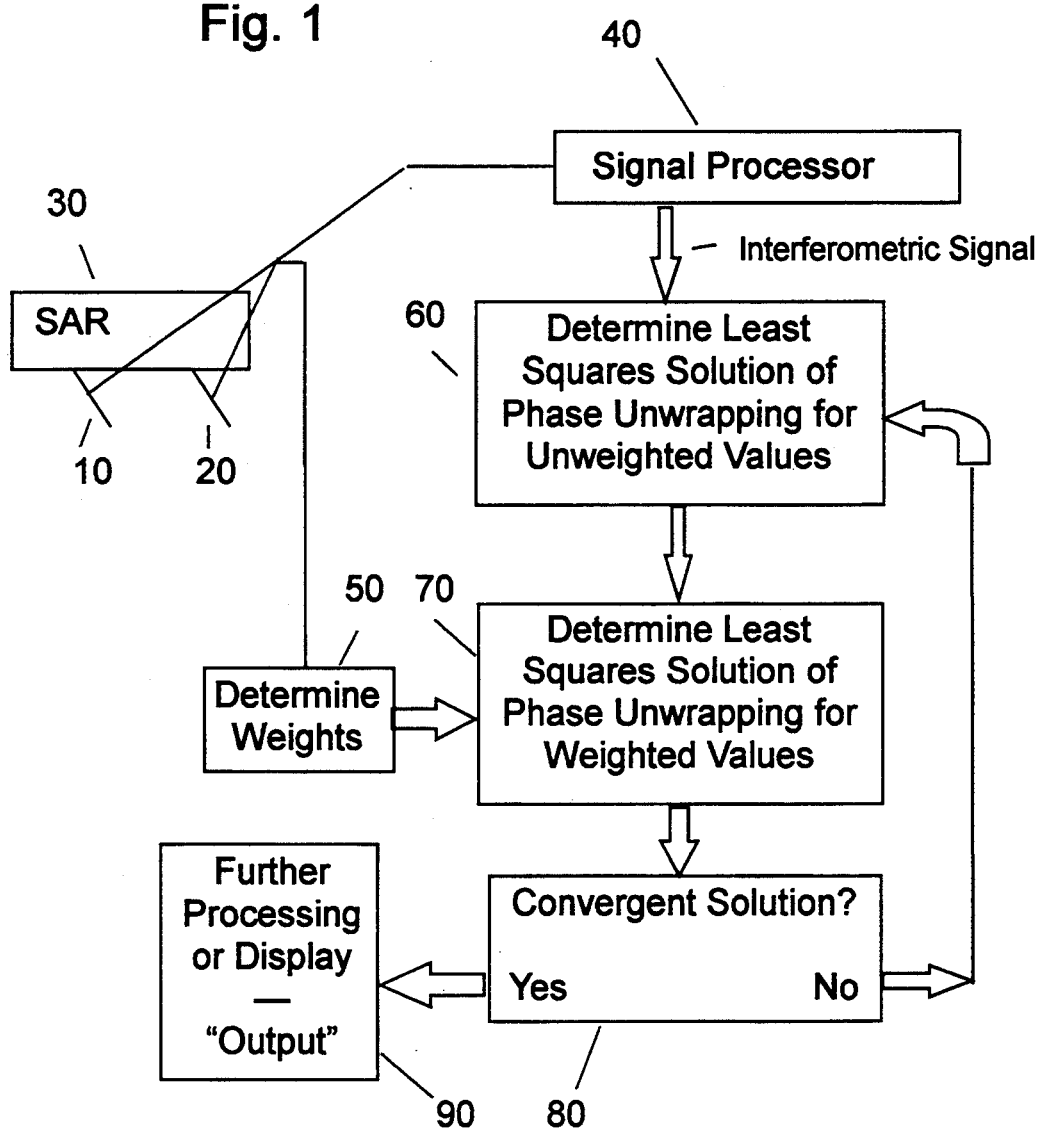
FIG. 1 shows a schematic diagram of the invention.

A typical SAR interferometric system will have at least two antennas arranged perpendicular to the flight path, as shown by FIG. 2A of the Gabriel et al. patent. Since the phase differences from these antennas are usually obtained in two orthogonal directions (i.e., x and y), the problem is to reconstruct the phase (e.g. phase unwrapping) from the noisy measurement. Since some portions of the returned signal will be stronger than others, another problem is to weight the phase differences according to the strength of the signal, or by some other appropriate weighting.

In accordance with this invention, the problem is best addressed by first phase unwrapping the two-dimensional unweighted signals, which signals have a measured phase, $\Phi$ modulo $2\pi$, on a discrete grid of points:

$$\psi_{i,j} = \phi_{i,j} + 2\pi k, \; k \text{ an integer,} \qquad \text{(EQ 1)}$$
$$-\pi < \psi_{i,j} \leq \pi, \; i = 0 \ldots M - 1, j = 0 \ldots N - 1$$

Given the wrapped phase values, $\psi_{i,j}$, the unwrapped phase values, $\Phi_{i,j}$, at the same grid locations must be determined with the requirement that the phase differences of the $\Phi_{i,j}$ agree with those of the $\psi_{i,j}$ in the least-squares sense. For this operation:

Define a wrapping operator W, that wraps all values of its argument into the range $(-\pi, \pi)$ by adding or subtracting an integral number of $2\pi$ radians from its argument. Therefore, for example, $W\{\Phi_{i,j}\} = \psi_{i,j}$.

Next, compute two sets of phase differences: those differences with respect to the i index, and those with respect to the j index. Specifically, from the known values of the wrapped phase $\psi_{i,j}$, compute the following wrapped phase differences, $$\Delta^x_{i,j} = W\{\psi_{i+1,j} - \psi_{i,j}\}, \; i = 0 \ldots M - 2, j = 0 \ldots N - 1 \qquad \text{(EQ 2)}$$

$$\Delta^x_{i,j} = 0, \text{ otherwise,}$$

and $$\Delta^y_{i,j} = W\{\psi_{i,j+1} - \psi_{i,j}\}, \; i = 0 \ldots M - 1, j = 0 \ldots N - 2 \qquad \text{(EQ 3)}$$

$$\Delta^y_{i,j} = 0, \text{ otherwise,}$$

where the x and y superscripts refer to differences in the i and j indices, respectively. The solution, $\Phi_{i,j}$, that minimizes $$\sum_{i=0}^{M-2} \sum_{j=0}^{N-1} (\phi_{i+1,j} - \phi_{i,j} - \Delta^x_{i,j})^2 + \sum_{i=0}^{M-1} \sum_{j=0}^{N-2} (\phi_{i,j+1} - \phi_{i,j} - \Delta^y_{i,j})^2$$

is the least-squares solution.

It is known from B. R. Hunt, "Matrix formulation of the reconstruction of phase values from phase differences," J. Opt. Soc. Am. 69, 393–399, (1979), that the normal equations leading to the least-squares phase unwrapping solution can be summarized by the following simple equation:

$$(\Phi_{i+1,j}+\Phi_{i-1,j}+\Phi_{i,j+1}+\Phi_{i,j-1}-4\Phi_{i,j})=\rho_{i,j} \quad \text{(EQ 4)}$$

This equation gives the relationship between the wrapped phase differences (available from the original wrapped phases via EQs 2 and 3) and the unwrapped phase values $\Phi_{i,j}$, in the least-square-error sense. A simple manipulation of EQ 4 yields $$(\Phi_{i+1,j}-2\Phi_{i,j}+\Phi_{i-1,j})+(\Phi_{i,j+1}-2\Phi_{i,j}+\Phi_{i,j-1}) = \rho_{i,j}, \quad \text{(EQ 5)}$$

where $$\rho_{i,j} = (\Delta^x_{i,j} - \Delta^x_{i-1,j}) + (\Delta^y_{i,j} - \Delta^y_{i,j-1}) \quad \text{(EQ 6)}$$

It is now easy to see that EQ 5 is a discretization of Poisson's equations on a rectangular M×N grid:

$$\frac{\partial^2}{\partial x^2}\phi(x,y) + \frac{\partial^2}{\partial y^2}\phi(x,y) = \rho(x,y). \quad \text{(EQ 7)}$$

EQ 5 is valid for all indices on the rectangular grid, $i=0\ldots M-1, j=0\ldots N-1$, and that the appropriate phase differences that are used to compute $\rho_{i,j}$ in EQ 6 are non-zero only if they come from phases entirely within the rectangular grid (i.e. EQs 2 and 3). This requirement results directly from the least-squares formulation and forms the discrete equivalent of imposing Neumann boundary conditions on Poisson's equation. Specifically, (as stated in Equations 2 and 3):

$$\begin{matrix}\Delta^x_{-1,j} = 0 \\ \Delta^x_{M-1,j} = 0\end{matrix} \quad j=0\ldots N-1 \quad \text{(EQ 8)}$$

$$\begin{matrix}\Delta^y_{i,-1} = 0 \\ \Delta^y_{i,N-1} = 0\end{matrix} \quad i=0\ldots M-1 \quad \text{(EQ 9)}$$

It is also worth noting that the wrapped phase differences given by EQs 2 and 3 are the equivalent of the measured phase differences in Hunt's (and others) formulation. Since 2D phase unwrapping had its roots in adaptive optics, etc., phase differences obtained from wave-front tilt sensors, etc., were necessarily wrapped values. Therefore, to formulate the 2D unwrapping from measured or computed values of wrapped phase, wrapped phase differences, not ordinary phase differences, must be used in the formation of the driving term (or right-hand side) $\rho_{i,j}$, of the resulting partial differential EQ 5.

EQ 4 (or EQ 5) is solved using a specific form of a cosine expansion taught by J. S. Lim, "The discrete cosine transform" in *Two-Dimensional Signal and Image Processing* (Prentice-Hall, Englewood Cliffs, N.J., 1990), pp. 148–157. which leads to a fast discrete cosine transform (DCT) implementation:

Forward 2D DCT:

$$C_{m,n} = \begin{cases} \sum_{i=0}^{M-1}\sum_{j=0}^{N-1} 4x_{i,j}\cos\left[\frac{\pi}{2M}m(2i+1)\right]\cos\left[\frac{\pi}{2N}n(2j+1)\right] \\ 0 \leq m \leq M-1 \\ 0 \leq n \leq N-1 \\ 0, \text{otherwise} \end{cases} \quad \text{(EQ 10)}$$

Inverse 2D DCT:

$$x_{i,j} = \begin{cases} \frac{1}{MN}\sum_{m=0}^{M-1}\sum_{n=0}^{N-1} w_1(m)w_2(n)C_{m,n}\cos\left[\frac{\pi}{2M}m(2i+1)\right]\cos\left[\frac{\pi}{2N}n(2j+1)\right] \\ 0 \leq i \leq M-1 \\ 0 \leq j \leq N-1 \\ 0, \text{otherwise} \end{cases} \quad \text{(EQ 11)}$$

where $w_1(m) = \frac{1}{2}, m = 0,$
$w_1(m) = 1, 1 \leq m \leq M-1,$
$w_2(n) = \frac{1}{2}, n = 0,$
$w_2(n) = 1, 1 \leq n \leq N-1,$ It is important to note that the above cosine expansion imposes the Neumann boundary conditions, $\nabla\Phi\cdot n=0$, automatically and leads to the exact solution of EQ 5 as will be shown.

The desired solution $\Phi_{i,j}$ expanded in the form of EQ 11 to form $$\phi_{i,j} = \frac{1}{MN}\sum_{m=0}^{M-1}\sum_{n=0}^{N-1} w_1(m)w_2(n)\hat{\phi}_{m,n}\cos\left[\frac{\pi}{2M}m(2i+1)\right]\cos\left[\frac{\pi}{2N}n(2j+1)\right] \quad \text{(EQ 12)}$$

and is substituted into EQ 5. Performing a similar expansion and substitution for the right-hand-side of EQ 5 and rearranging the result yields the following exact solution in the DCT domain:

$$\hat{\phi}_{i,j} = \frac{\hat{\rho}_{i,j}}{2\left(\cos\frac{\pi i}{M} + \cos\frac{\pi j}{N} - 2\right)} \quad \text{(EQ 13)}$$

The unwrapped phase $\Phi_{i,j}$ is now easily obtained by the inverse DCT of EQ 13.

It is easily shown by simple substitution that the expansion given by EQ 12 automatically imposes the discrete equivalent of the required Neumann boundary conditions:

$$\begin{aligned}\phi_{0,j} - \phi_{-1,j} &= 0 \\ \phi_{M,j} - \phi_{M-1,j} &= 0, j = 0 \ldots N-1 \\ \phi_{i,0} - \phi_{i,-1} &= 0 \\ \phi_{i,N} - \phi_{i,N-1} &= 0, i = 0 \ldots M-1\end{aligned} \quad \text{(EQ 14)}$$

The 2D unweighted unwrapped phase is determined as follows:

1. Perform the 2D forward DCT (EQ 10) of the array of values, $\rho_{i,j}$, computed by EQ 6, to yield the 2D DCT values $\hat{\rho}_{i,j}$.
2. Modify the values $\hat{\rho}_{i,j}$ according to EQ 13 to obtain $\hat{\Phi}_{i,j}$.
3. Perform the 2D inverse DCT (EQ 11) of $\hat{\Phi}_{i,j}$ to obtain the least-squares unwrapped phase values $\Phi_{i,j}$.

It is important to note that EQ 13 cannot be evaluated for both i=0 and j=0 simultaneously because the denominator becomes zero. This means that $\hat{\Phi}_{0,0}$ is indeterminate because Poisson's equation cannot be solved for a constant bias component. In practice we usually set $\hat{\Phi}_{0,0} = \hat{\rho}_{0,0}$ to leave the bias unchanged.

This section showed how to solve the over-determined set of linear equations, $$Ax = b \quad \text{(EQ 15)}$$

in a least-squares sense using cosine transforms. The least-squares solution is, of course, the solution to the normal equations, $$A^T A x = A^T b \quad \text{(EQ 16)}$$

where x is a length MN solution vector of phase values, b is a vector of length N (M−1)+M(N−1) containing the wrapped phase differences, and T refers to matrix transposition. EQ 16 may be rewritten:

$$P\Phi = \rho \quad \text{(EQ 17)}$$

where $P = A^T A$ is a matrix that performs the discrete Laplacian operation on the vector $\Phi$ as illustrated in EQ 5, and $\rho = A^T b$ is a vector containing the discrete Laplacian operation on the wrapped phase differences as illustrated in EQ 6. Therefore, EQ 17 can be solved using the 2D unweighted phase process.

Two-Dimensional Weighted Phase Unwrapping

When certain wrapped phase values are known to be corrupted by regionally varying noise, measurement errors, aliasing, or other degrading influences, those values should be weighted appropriately to obtain a more robust unwrapping. In addition, a priori information based on the physics of the underlying problem may dictate that certain regions of the unwrapped phase be isolated from one another. For example, phase surfaces that contain regional shearing or isolated regions of no phase information whatsoever, can be weighted so that the unwrapped phase solution is not required to meet continuity constraints across any shearing or defined regional boundary.

The next step is to solve the weighted least-squares problem, $$WAx = Wb \quad \text{(EQ 18)}$$

The resulting normal equations for the weighted least-squares a problem are $$A^T W^T W A x = A^T W^T W b \quad \text{(EQ 19)}$$

where W is a matrix of weighting values.

Now let $Q = A^T W^T W A, \bar{b} = W^T W b$, and substitute these into EQ 19 to obtain $$Qx = A^T \bar{b}. \quad \text{(EQ 20)}$$

With the final substitution, $$c = A^T \bar{b} \quad \text{(EQ 21)}$$

and associating the desired solution $\Phi$ with x, we obtain $$Q\Phi = c. \quad \text{(EQ 22)}$$

It is important to note that $\bar{b}$ is simply a vector consisting of appropriately weighted phase differences, and that EQ 21 indicates that c is nothing more than a vector formed from the modified discrete Laplacian (defined in EQ 26) of the weighted wrapped phase differences, entirely analogous to what was done to form the right-hand side of EQ 17. Therefore, EQ 22 is the matrix equation defining the 2D weighted least-squares phase unwrapping problem.

EQ 22 is solved using the solution to EQ 17, as set forth below.

Preconditioned Conjugate Gradient for 2D Weighted Least-Squares Phase Unwrapping Conjugate gradient (CG) methods are a means of iteratively solving a set of sparse linear equations, of which the discretized version of Poisson's equation (such as EQ 5) is one. The conjugate gradient technique poses the solution of the linear equations as a minimization problem and obtains much faster convergence than simpler minimization schemes, such as steepest descent. The CG algorithm has robust convergence properties with well defined termination conditions. Ignoring roundoff error, CG converges in exactly N iterations for N×N problems. However, for large N, the number of iterations may still be excessive and exact convergence is not guaranteed because of numerical roundoff error. In practice, CG is used as a true iterative algorithm to obtain an approximate solution in much less than N iterations.

For very large problems, the number of iterations required may still be excessive. The actual number of iterations required to obtain an accurate solution depends on the condition number of the underlying matrix. If the underlying matrix is "near" the identity matrix, CG converges very quickly. Preconditioned conjugate gradient (PCG) methods apply a "preconditioning" step that effectively transforms the underlying matrix to one very near the identical matrix; hence, very rapid convergence is obtained.

To be useful in PCG, the preconditioner must be "close" to the matrix of interest and must represent an easily solvable linear system. In this case, the preconditioning is obtained by solving an approximate problem and then updating the solution at each iteration. The solution to the approximate problem is the unweighted least squares solution. This solution is then used to obtain an estimate for the true solution to the exact problem.

The PCG method of 2D weighted least-squares phase unwrapping is summarized in the following process:

1. $k=0$ $\Phi_0=0$ $r_0=c$
2. While $r_k \neq 0$ solve $Pz_k = r_k$ using the unweighted least squares phase unwrapping process.
3. $k=k+1$
4. If $k=1$, $p_1 = z_0$.
5. If $k>1$, then $$\beta_k = r_{k-1}^T z_{k-1} / r_{k-2}^T z_{k-2}$$
$$p_k = z_{k-1} + \beta_k p_{k-1}$$

6. Perform one scalar and two vector updates $$\alpha_k = r_{k-1}^T z_{k-1} / p_k^T Q p_k$$
$$\phi_k = \phi_{k-1} + \alpha_k p_k$$
$$r_k = r_{k-1} - \alpha_k Q p_k$$

7. $k \geq k_{max}$, or $\|r_k\| < \epsilon \|r_0\|$, end; otherwise go to 2.

This process efficiently incorporates the DCT method within the robust structure of conjugate gradients to solve the weighted least-squares problem iteratively. It can easily incorporate any efficient and robust method of solution of the unweighted unwrapping problem into the weighted unwrapping framework.

To implement this invention, the forward and inverse 2D DCT's given in EQ's 10 and 11, respectively, can be computed by fast algorithms when M and N are powers of 2 (although non-powers of two are not restrictive). In addition, the DCT is separable as is the fast Fourier transform, thus permitting independent row and column transforms, and all transforms can be accomplished in place with regard to the available memory.

It is convenient to implement the 2D DCT as a separable process and to utilize readily available subroutines for computing the fast summation expansions. For example, the one dimensional versions of the DCT may be rewritten and expanded to yield the following:

$$C_m = 2 \cos \frac{\pi m}{2M} \sum_{i=0}^{M-1} x_i \cos \frac{\pi n}{2M} i - \qquad (EQ\ 23)$$

$$2 \sin \frac{\pi m}{2M} \sum_{i=0}^{M-1} x_i \sin \frac{\pi m}{M} i$$

where $$x_i = \frac{1}{M} \sum_{i=0}^{M-1} {}^1\hat{C}_m \cos \frac{\pi m}{M} i - \frac{1}{M} \sum_{i=0}^{M-1} {}^2\hat{C}_m \sin \frac{\pi m}{M} i \qquad (EQ\ 24)$$

and $${}^1\hat{C}_m = w_1(m) C_m \cos \frac{\pi m}{2M} \text{ and } {}^2\hat{C}_m = w_1(m) C_m \sin \frac{\pi m}{2M} \qquad (EQ\ 25)$$

The summation terms in EQs 23 and 24 containing the cosine and sine expansions are easily computed as fast algorithms by means of the FORTRAN subroutines COSFT and SINFT, as described in W. Press et al., *Numerical Recipes: The Art of Scientific Computing*, Cambridge U. Press, Cambridge, (1986). COSFT must be used in the forward mode in all cases.

The denominator of EQ 13 must be computed in double precision and converted to single precision to avoid numerical zeros for low values of the i and j indices other than zero, especially for large M and N. No other requirement for double precision computation has been found.

Weighting is provided by a weighting array. In practice, the elements of the weighting array $w_{i,j}$ (which should not be confused with the vectors $w_1(m)$ and $w_2(m)$ in the DCT EQs 10 and 11) are in one-to-one correspondence with the original wrapped phase values $\psi_{i,j}$. To compute the modified Laplacian, proper weighting is applied to the phase difference, not the phase values. Phase differences are computed by selecting the minimum of the two weights corresponding to the two phases as the proper weight to apply to that phase difference.

For example, the elements of the vector c from EQ 21, when written in 2D-array notation, become the modified discrete Laplacian of the original wrapped phases:

$$c_{i,j} = \min(w_{i+1,j}^2, w_{i,j}^2) \Delta_{i,j}^x - \min(w_{i,j}^2, w_{i-1,j}^2) \Delta_{i-1,j}^x + \qquad EQ\ 26$$
$$\min(w_{i,j+1}^2, w_{i,j}^2) \Delta_{i,j}^y - \min(w_{i,j}^2, w_{i,j-1}^2) \Delta_{i,j-1}^y$$

Examples of Two-Dimensional Phase Unwrapping

As shown in FIG. 1, a preferred embodiment of the invention includes a pair of spaced synthetic aperture radar antenna 10 and 20 mounted on a platform 30 such as an aircraft or satellite. The signals received by these antennas are processed by signal processor 40 in a fashion known to those of ordinary skill in the art to provide an interferometric signal. The received signals from the antennas are also processed as shown at 50 to determine the weighting to be applied to the invention. The weighting may conveniently be a function of signal intensity; a strong signal receiving a weight of "1", a weaker signal receiving a lesser value.

The interferometric signal is processed at 60 to determine the least squares solution of phase unwrapping for the unweighted values. This output is processed at 70 to determine the least squares solution of phase unwrapping for weighted values. After each iteration, a selection at 80 determines if the value has converged as set forth above; if the answer is "yes" then the solution is sent to output 90; if the answer is "no" it is fed back to process 60.

Figure 2:
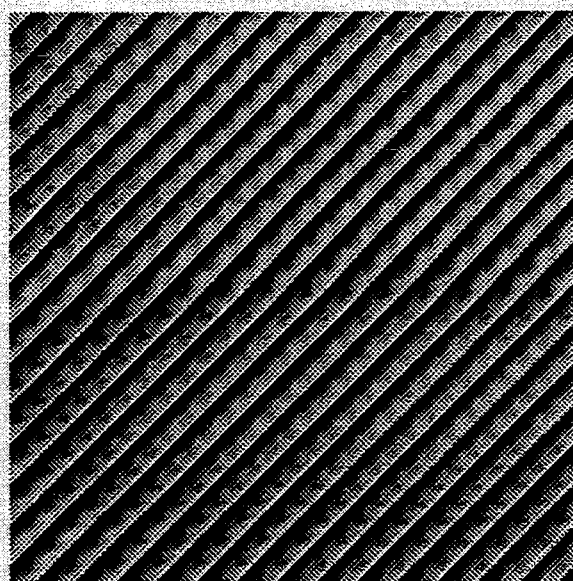
FIG. 2 shows wrapped values from Example 1.

FIG. 2 shows the detected wrapped values of a 512×512 pixel 2D phase-plane array (Example 1). All images depicting wrapped phases in the range $(-\pi, \pi)$ are scaled between black and white (i.e., 0-255) for display. Unwrapped phase images are also scaled between black and white to capture the full dynamic range.

Figure 3:
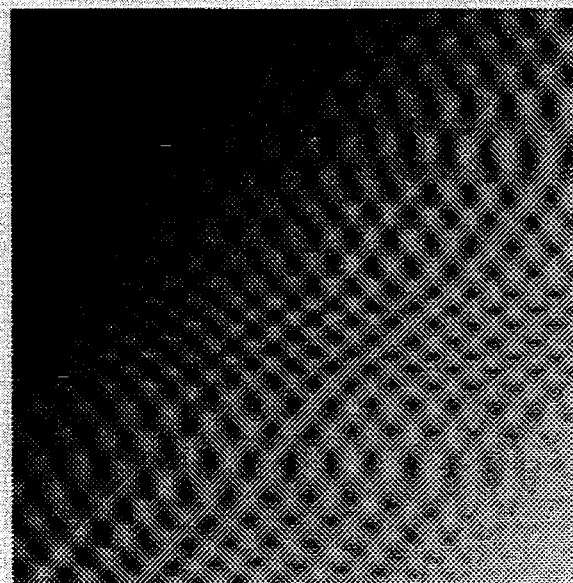
FIG. 3 shows the unwrapped values from Example 1.

It can be easily seen that this wrapped phase plane represents phase values that increase linearly from the upper left-hand corner to the lower right-hand corner. Unwrapping these values with the least squares solution of phase unwrapping for unweighted values as disclosed herein yields the phase plane shown in FIG. 3.

Because the dynamic range of the unwrapped result is large, visual display is not always convincing that the unwrapping is correct. Therefore the unwrapped values were rewrapped to permit a direct comparison with the wrapped input. The rewrapped values were qualitatively consistent (with the possible exception of an inconsequential constant bias) with the original input depicted in FIG. 2. Because the original input was noise free and totally consistent, the unweighted least-squares unwrapping was perfect.

The remaining examples illustrate how least-squares unwrapping accommodates inconsistent data and how the unwrapped values are locally influenced.

Figure 4:
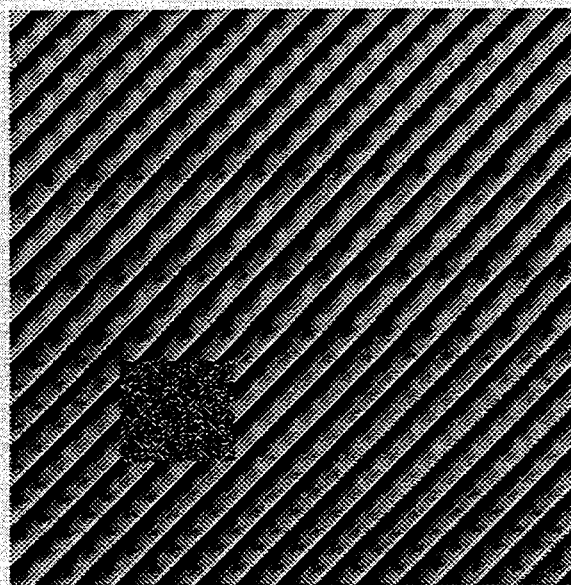
FIG. 4 shows unweighted phase wrapped values from Example 2, having an area of noise.
Figure 5:
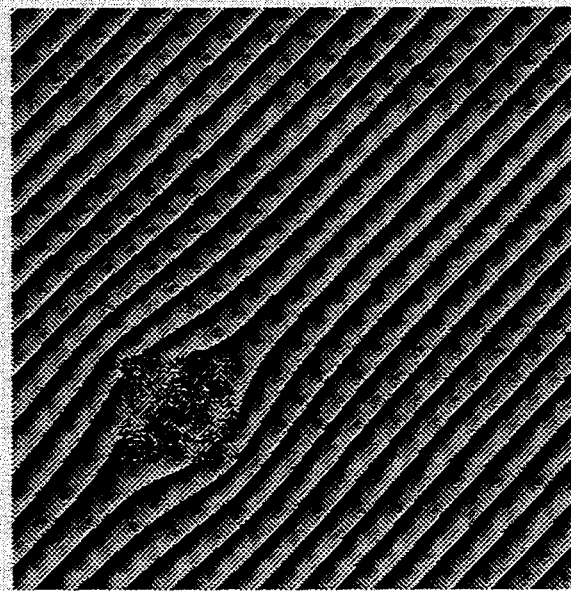
FIG. 5 shows the rewrapped values of FIG. 4.

For Example 2, the perfect data depicted in FIG. 2 is modified by replacing the phase values in a rectangular region with uniform noise, as shown in FIG. 4. The phase values are inconsistent in the rectangular region and around its boundary. These inconsistencies are accommodated by the least-squares formulation of the unweighted calculations and influence the unwrapping regionally. FIG. 5 shows the rewrapped phase after unweighted unwrapping of the data depicted in FIG. 4. It is easy to see how the least-squares approach accommodates noise and how the unwrapped phase is influenced in the vicinity of inconsistent data with diminishing effects further away.

Example 2 showed that if good phase values are corrupted or destroyed in a region because of noise, aliasing, etc., the unwrapped results are influenced mostly in the vicinity of the bad values, but they also influence the result globally. If a corresponding weighting array can be defined, the noisy phase values can be prevented from having any influence on the result simply by assigning a weight of zero to the inconsistent data.

Figure 6:
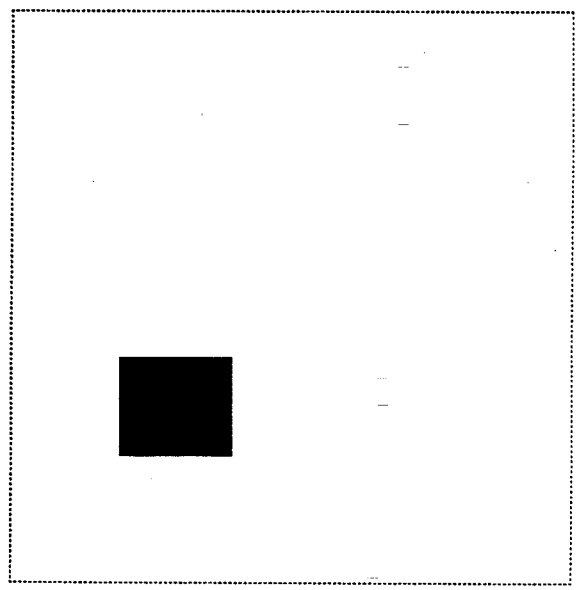
FIG. 6 shows the weighted array for Example 2.

FIG. 6 depicts the corresponding weighting array to accompany the phase values of FIG. 4. The black rectangular region corresponds to zero-valued weights, and the remainder of the 512×512 array is set to unity weight and is shown as white. The one-pixel-wide dark outside border is superimposed just to locate the proper array size in the figure.

The result of applying the weighted least-squares phase unwrapping in accordance with this invention to Example 2, and then rewrapping this result, is identical to FIG. 2. The unwrapped phase is continuous across the noisy region even though the weights were zero.

The weighting values need not be binary, of course, but can reflect the certainty or uncertainty of the underlying data integrity according to the particular problem at hand. One can have full confidence that the converged solution will be correct in the true weighted least-squares sense.

These examples are simple in structure (for easy visualization and qualitative assessment) but contain exactly the kinds of phase inconsistency encountered in virtually all practical problems. More-complicated wrapped phase data would not provide a more-thorough test or illuminate subtle performance comparisons of the algorithms. One also can use weighted unwrapping to unwrap phases in non-power-of-two-sized rectangular regions, using the fast DCT method by defining unity weighting over the valid region of support and defining zero out to the power-of-two-array boundaries otherwise. Arbitrary regions can be isolated and unwrapped independently and simultaneously by definition of an appropriate weighting array.

The unweighted least-square computation is based on fast transforms and is very efficient, requiring $O(N^2 \log_2 N)$ operations for the 2D DCT of an $N \times N$ array. The time required for performing a 2D unweighted unwrapping on a 512×512 sample file of wrapped phase values is of the order of 10 seconds for a SUN Sparc 10 workstation. Since the unweighted calculations are embedded in the iteration loop for the weighted calculations and forms the bulk of the computation, the time required for solving weighted 2D phase unwrapping is of the order of $k_{max}$ times the time for an unweighted unwrap, where $k_{max}$ is the maximum number of iterations.

For input data files much larger than available physical memory, efficient disk-to-disk matrix transpose routines exist for facilitating implementation of the 2D DCT. Tests of this invention have successfully unwrapped unweighted files exceeding 8K×8K samples, in single-precision arithmetic, on Sparc workstations in approximately 2 hours (including input-output). Because of the iterative nature of the weighted calculations, smaller data sets are typically used for weighted unwrapping problems. Although there are no fundamental restrictions on data-set sizes, it is much more efficient to fit the problem entirely within available memory when one is using the iterative techniques.

This invention spans a rather large range of requirements for 2D phase unwrapping of sampled data. Phase noise, data inconsistencies, and other degradations are automatically accommodated by the least-squares formulation without operator intervention (unlike path-following unwrapping algorithms).

When additional information is available, the weighted least-squares calculations offer great potential. For example, the incorporation of a weighting array permits exact unwrapping of phase data with shears, deemphasis of suspect phase values, elegant elimination of totally corrupted regions, arbitrarily shaped region unwrapping, and simultaneous unwrapping of multiple isolated arbitrary regions.

The invention uses an efficient implementation of the fast 2D DCT as the basis for least-squares unwrapping. Separable and in-place computation, simple algorithmic structures, and efficient input-output capabilities allow the invention to be implemented easily on modern workstations. Very large 2D phase unwrapping problems have been successfully performed, in single-precision (32-bit floating point) arithmetic, on these workstations in a few seconds to a couple of hours, depending on data-set size and problem requirements.

The particular sizes and equipment discussed above are cited merely to illustrate a particular embodiment of this invention. It is contemplated that the use of the invention may involve other techniques as long as the principle of using the unweighted calculations as a starting point for weighted calculations, is followed. For example, Picard iteration techniques have also be used to solve the weighted problem, although these techniques do not always converge fast enough for practical computations. It is intended that the scope of the invention be defined by the claims appended hereto.

We claim:

1. A system for phase unwrapping weighted values of interferometric signals comprising:
   means for determining the least squares solution of phase unwrapping for unweighted values of the interferometric signals; and
   means for determining the least squares solution of phase unwrapping for weighted values of the interferometric phase signals by preconditioned conjugate gradient methods using the unweighted solutions as preconditioning values.

2. The system of claim 1 wherein said interferometric phase signals are generated by a pair of spaced synthetic aperture radars.

3. A method for phase unwrapping weighted values of interferometric signals comprising:
  generating interferometric signals;
  determining the least squares solution of phase unwrapping for unweighted values of the interferometric signals;
  determining the least squares solution of phase unwrapping for weighted values of the interferometric signals by preconditioned conjugate gradient methods using the unweighted solutions as preconditioning values; and
  generating an output representative of the least squares solution of phase unwrapping for weighted values of the interferometric signals.

4. The method of claim 3 wherein said interferometric signals are generated by SAR.

5. The method of claim 3 wherein the step of determining the least squares solution of phase unwrapping for unweighted values of the interferometric signals comprises:
  determining the 2D forward direct cosine transform values $\rho_{i,j}$, of the array of values, $\hat{\rho}_{i,j}$, where $$\rho_{i,j} = (\Delta^x_{i,j} - \Delta^x_{i-1,j}) + (\Delta^y_{i,j} - \Delta^y_{i,j-1}), \text{ and}$$

$$\Delta^x_{i,j} = W\{\psi_{i+1,j} - \psi_{i,j}\}, i = 0 \ldots M-2, j = 0 \ldots N-1$$
$$\Delta^x_{i,j} = 0, \text{ otherwise},$$
$$\Delta^y_{i,j} = W\{\psi_{i,j+1} - \psi_{i,j}\}, i = 0 \ldots M-1, j = 0 \ldots N-2$$
$$\Delta^y_{i,j} = 0, \text{ otherwise},$$

where the x and y superscripts refer to differences in the i and j indices, respectively; and
  performing the 2D inverse direct cosine transform of $\hat{\Phi}_{i,j}$ to obtain the least-squares unwrapped phase values $\Phi_{i,j}$, where $$\hat{\phi}_{i,j} = \frac{\hat{\rho}_{i,j}}{2\left(\cos\frac{\pi i}{M} + \cos\frac{\pi j}{N} - 2\right)}.$$

6. The method of claim 5 wherein said interferometric signals are generated by SAR.

7. The method of claim 5 wherein said step of determining the least squares solution of phase unwrapping for weighted values of the interferometric signals comprises:
  (a) determine the modified discrete Laplacian of the orignal wrapped phases $$c_{i,j} = \min(w^2_{i+1,j}, w^2_{i,j})\Delta^x_{i,j} - \min(w^2_{i,j}, w^2_{i-1,j})\Delta^x_{i-1,j} +$$
$$\min(w^2_{i,j+1}, w^2_{i,j})\Delta^y_{i,j} - \min(w^2_{i,j}, w^2_{i,j-1})\Delta^y_{i,j-1};$$

(b) set $\rho_{i,j} = c_{i,j}$
  (c) determine the least squares solution as set forth in claim 5;
  (d) perform scalar and vector updates, $$\alpha_k = r^T_{k-1}z_{k-1}/p_k^T Q p_k$$
$$\phi_k = \phi_{k-1} + \alpha_k p_k$$
$$r_k = r_{k-1} - \alpha_k Q p_k$$

where $$\beta_k = r^T_{k-1}z_{k-1}/r^T_{k-2}z_{k-2}$$
$$p_k = z_{k-1} + \beta_k p_{k-1}$$

(e) repeat (c) using values of $r_k$ from (c) until $\|r_k\|$ converges to an acceptable value.

8. The method of claim 7 wherein said interferometric signals are generated by SAR.

* * * * *